United States Patent
Shaw

(10) Patent No.: US 10,455,574 B2
(45) Date of Patent: *Oct. 22, 2019

(54) METHOD AND APPARATUS FOR PROVIDING ADAPTABLE MEDIA CONTENT IN A COMMUNICATION NETWORK

(71) Applicant: AT&T Intellectual Property I, L.P., Atlanta, GA (US)

(72) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/819,553

(22) Filed: Nov. 21, 2017

(65) Prior Publication Data

US 2018/0124760 A1    May 3, 2018

Related U.S. Application Data

(63) Continuation of application No. 15/055,824, filed on Feb. 29, 2016, now Pat. No. 9,854,581.

(51) Int. Cl.
*H04W 4/021* (2018.01)
*H04W 72/04* (2009.01)
*G06Q 99/00* (2006.01)

(52) U.S. Cl.
CPC .......... *H04W 72/044* (2013.01); *G06Q 99/00* (2013.01); *H04W 4/021* (2013.01); *H04W 72/0406* (2013.01)

(58) Field of Classification Search
CPC .................................................. H04W 72/021
See application file for complete search history.

(56) References Cited

U.S. PATENT DOCUMENTS

| 5,553,221 A | 9/1996 | Reimer et al. |
| 8,913,790 B2 | 12/2014 | Hennessy |

(Continued)

FOREIGN PATENT DOCUMENTS

| JP | 2014237044 A | 12/2014 |
| WO | 2006043925 A1 | 4/2006 |

(Continued)

OTHER PUBLICATIONS

"Considerations for Building a Context-Aware App", Mobiquity, wsta.org, Nov. 2013.

(Continued)

*Primary Examiner* — Sulaiman Nooristany
(74) *Attorney, Agent, or Firm* — Guntin & Guntin, PLC; Douglas Schnabel

(57) ABSTRACT

Aspects of the subject disclosure may include, for example, a method for determining an emotional characteristic associated with a user according to biologic information received from a mobile communication device, receiving, from the mobile communication device, availability information associated with the user, modifying a first version of a media selection according to the emotional characteristic of the user to generate a second version of the media selection, and transmitting the second version of the media selection to the mobile communication device associated with the user for presentation at the mobile communication device. The modifying can include selecting, for inclusion in the second version of the media selection, a first portion of the first version of the media selection corresponding to the emotional characteristic. Other embodiments are disclosed.

20 Claims, 7 Drawing Sheets

(56) References Cited

U.S. PATENT DOCUMENTS

| | | |
|---|---|---|
| 8,994,613 B1 | 3/2015 | Starner et al. |
| 9,031,857 B2 | 5/2015 | Angell et al. |
| 9,101,279 B2 | 8/2015 | Ritchey et al. |
| 9,122,752 B2 | 9/2015 | Bill |
| 2006/0253330 A1 | 11/2006 | Maggio et al. |
| 2007/0214471 A1 | 9/2007 | Rosenberg et al. |
| 2007/0271518 A1 | 11/2007 | Tischer et al. |
| 2014/0096152 A1 | 4/2014 | Ferens et al. |
| 2014/0107531 A1 | 4/2014 | Baldwin et al. |
| 2014/0130076 A1 | 5/2014 | Moore et al. |
| 2014/0189727 A1 | 7/2014 | Chen et al. |
| 2014/0195328 A1 | 7/2014 | Ferens et al. |
| 2014/0272843 A1* | 9/2014 | Foster ............ G09B 5/02 434/236 |
| 2014/0324922 A1 | 10/2014 | Edelstein et al. |
| 2014/0331242 A1 | 11/2014 | De La Garza et al. |
| 2015/0070516 A1 | 3/2015 | Shoemake et al. |
| 2015/0128788 A1 | 5/2015 | Brewer |
| 2015/0264431 A1 | 9/2015 | Cheng |
| 2015/0347764 A1 | 12/2015 | Cornell et al. |
| 2015/0348122 A1 | 12/2015 | Cornell et al. |
| 2017/0004459 A1 | 1/2017 | Karsten |
| 2017/0251459 A1 | 8/2017 | Shaw |

FOREIGN PATENT DOCUMENTS

| | | |
|---|---|---|
| WO | 2009033187 A1 | 3/2009 |
| WO | 2015121436 | 8/2015 |
| WO | 2015121438 | 8/2015 |

OTHER PUBLICATIONS

Ashford, Holly, "Mind control TV", TVBEurope, tvbeurope.com, Feb. 4, 2014,.

Canavan, Cavan, "The Future Of Biometric Marketing", Tech Crunch, techcrunch.com, Dec. 21, 2014.

Marcengo, Alessandro et al., "isualization of human behavior data: The quantified self", Inovative Approaches of Data Visualization and Visual Analytics, 2013, 236-265.

Silveira, Fernando et al., "Predicting audience responses to movie content from electrodermal activity signals", Proceedings of the 2013 ACM international joint conference on Pervasive and ubiquitous computing. ACM, 2013.

Srinivasan, Prabhakar, "Web-of-Things solution to enrich TV viewing experience using Wearable and Ambient sensor data", http://www.w3.org/2014/02/wot/papers/srinivasan.pdf, 2014.

\* cited by examiner

300

METHOD AND APPARATUS FOR PROVIDING ADAPTABLE MEDIA CONTENT IN A COMMUNICATION NETWORK

CROSS REFERENCE TO RELATED APPLICATIONS

This application is a continuation of U.S. patent application Ser. No. 15/055,824, filed Feb. 29, 2016. The contents of the foregoing are hereby incorporated by reference into this application as if set forth herein in full.

FIELD OF THE DISCLOSURE

The subject disclosure relates to a method and apparatus for providing adaptable media content in a communication network.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
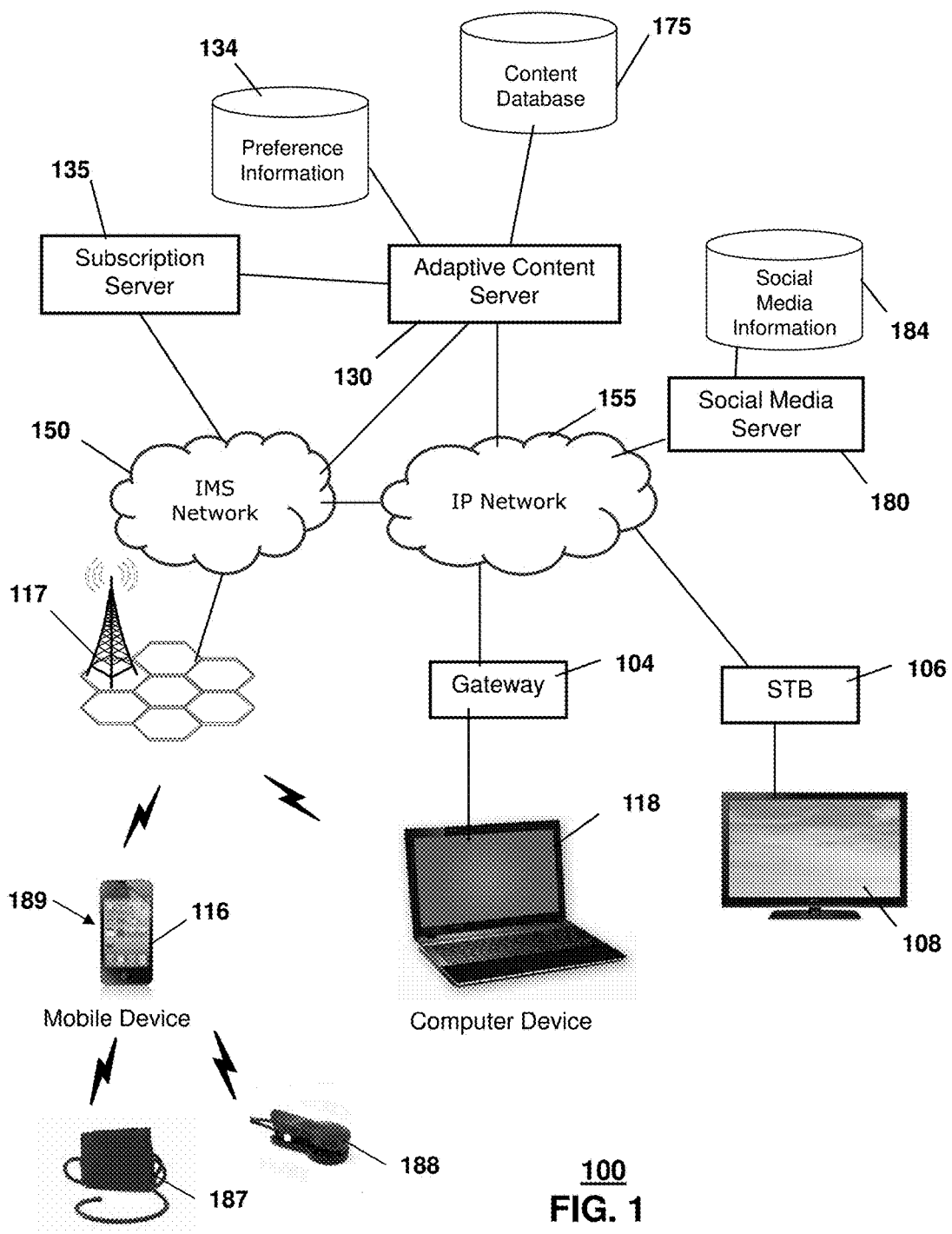
FIG. 1 depicts illustrative embodiments of a system for adapting media content in a communication network.

The subject disclosure describes, among other things, illustrative embodiments for a system and method for providing dynamically adaptable, media content in a communication network. A user of a devices, such as a mobile communication device, computer device, and/or media processor device, can be monitored on a continuous basis via one or more sensors. The sensors can detect biological information from the user, were the biologic information can body information (e.g., temperature, heart rate, respiration, blood pressure), and where the body information can be audio information and/or visual information. The biologic information can be analyzed by the system to determine one or more emotional characteristics of the user. If the system receives a request to provide a media selection to the user by, for example, streaming the media selection to a user equipment (UE) of the user, then the system can use an emotional characteristic of the user (derived from the biologic information) to determine how the media selection can be adapted to fit the user's current emotional characteristic. The media selection can be modified by selecting, from the media selection, a set of media content that corresponds to the emotional characteristic of the user. For example, if the biologic indicates a user that is in a happy mood, then the system can modify the user's selection of the movie, "Mrs. Doubtfire," to only retain the parts of the movie that are funny or happy, while discarding the unhappy or stressful parts of the movie. The user can receive a stream of the "happy version" of Mrs. Doubtfire. The system can also access information indicating the user's available time for experiencing the media selection, and can, in turn edit the media selection so as to create a runtime that fits the user's availability. Other embodiments are described in the subject disclosure.

One or more aspects of the subject disclosure include a server device including a memory to store executable instructions and a processor communicatively coupled to the memory. The processor, responsive to executing the executable instructions, can perform operations for receiving a request to provide a first media selection to user equipment associated with a user. The processor can perform operations for receiving, from a mobile communication device, first biologic information collected from the user, and, in turn, determining a first emotional characteristic associated with the user according to the first biologic information. The processor can also perform operations for receiving first availability information associated with the user. The processor can further perform operations for modifying a first version of the first media selection according to the first emotional characteristic of the user and the first availability information of the user to generate a second version of the first media selection, and, in turn, transmitting the second version of the first media selection to the user equipment associated with the user for presentation at the user equipment. The modifying can include selecting, for inclusion in the second version of the first media selection, a first portion of the first version of the first media selection corresponding to the first emotional characteristic. A first runtime of the second version of the first media selection can correspond to the first availability information.

One or more aspects of the subject disclosure include a method, operating at a system comprising a processor, including collecting biologic information associated with a user and, in turn, transmitting the biologic information to a media server. The method can include receiving a first version of a media selection from the media server, wherein the first version comprises a first portion of the media selection. The first portion can be selected from the media selection according to an emotional characteristic associated with the user that is determined according to the biologic information associated with the user. The method can also include presenting the first version of the media selection.

One or more aspects of the subject disclosure include a machine-readable storage medium, comprising executable instructions that, when executed by a processor, facilitate performance of operations, including determining an emotional characteristic associated with a user according to biologic information received from a mobile communication device. The operations can also include receiving, from the mobile communication device, availability information associated with the user. The operations can further include modifying a first version of a media selection according to the emotional characteristic of the user to generate a second version of the media selection, and, in turn, transmitting the second version of the media selection to the mobile communication device associated with the user for presentation at the mobile communication device. The modifying can include selecting, for inclusion in the second version of the media selection, a first portion of the first version of the media selection corresponding to the emotional characteristic.

Figure 2:
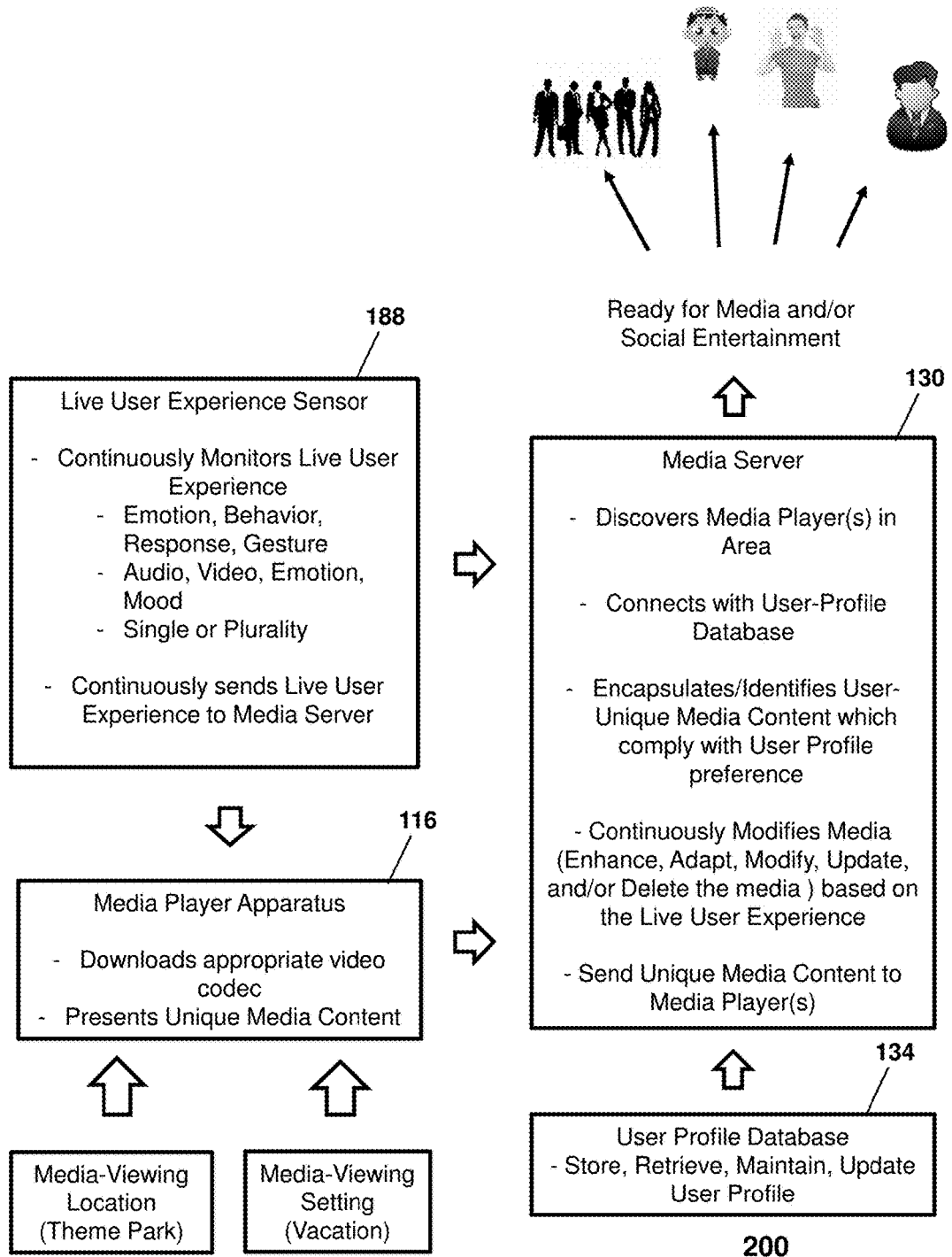
FIG. 2 depicts illustrative embodiments of a system for adapting media content in a communication network.

Referring now to FIGS. 1 and 2, a communication system 100 is illustrated. The system 100 can provide wireless communication services, including voice, video data and/or messaging services to mobile communications devices 116 and other computer devices 118. The system 100 can provide wireline communication services, such as serving as an Internet Service Provider (ISP) for computer devices 118. The system 100 can provide subscription television services via wired and/or wireless communications. For example, the system 100 can provide streaming media content to a mobile communication device 116, via a cellular link 117, to a computer device 118, via a wired or wireless gateway 104, or to a television or monitor device 108, via a set-top box device 106. System 100 can enable wireless communication services over a number of different networks, such as between mobile communication devices 116 and computer devices 118. Mobile communication devices 116 can include a number of different types of devices that are capable of voice, video, data and/or messaging communications, including cellular phones, smartphones, personal computers, media processing devices, and so forth.

In one or more embodiments, the communication system 100 can provide access to an Internet Protocol (IP) Multimedia Subsystem (IMS) network 150 to facilitated combined services of circuit-switched and packet-switched systems. The IMS network 150 can be accessed, for example, via one or more cellular base stations 117. For example, a mobile communication device 116 can connect to a cellular base station 117 via a wireless communication signal. The mobile communication device 116 can communication, via the IMS network 150, with other mobile communication devices, with landline communication devices, and with an Internet Protocol (IP) network 155, such as the Internet or the world-wide web (WWW). The communication system 100 can provide communications and sharing of various resources between mobile communication devices 116 and various devices, such as computer devices 118, which are connected to the IP network 155.

In one or more embodiments, the system 100 can include a dynamic adaptive content server 130. The adaptive content server 130 can receive media content from a content database 175. The content database 175 can be a collection of databases, combining databases that are part of a subscription media service, such a satellite and/or cable television provider and/or over-the-air or cable/satellite television channel, and/or an Internet-based content provider. The adaptive content server 130 can receive media content in various forms, including but not limited to, broadcast media content, movies, video-on-demand content, and/or live events. In one or more embodiments, herein, the adaptive content server 130 can receive the media content as video streams and/or as complete files.

In one or more embodiments, a subscriber can access the adaptive content server 130 from a device, such a mobile communication device 116, a computer device 118, or a television 108. In one example, a subscriber using a mobile communication device 116 can connect to the dynamic content server via the IMS network 150. The adaptive content server 130 can be accessed by a client application executing at the mobile communication device 116. In one or more embodiments, the adaptive content server 130 can access a subscription server 135 to authenticate the subscriber and/or the mobile communication device 116. The client application can require the subscriber to enter verification information, such as a username and passcode, which can be authenticated against a subscriber profile that is maintained at the subscriber server 135. In another example, the subscription server can maintain verification information for the mobile communication device 116, itself, such that the subscriber does not need to enter verification information. In one or more embodiments, the subscriber can access the adaptive content server 130 via the IP network 155 using, for example, a gateway device 104. The computer device 118 can use a client application or a general purpose browser to contact the adaptive content server 130 via a portal. The adaptive content server 130 can use the subscription server 130 for authenticating portal access by the computer device 118 using subscriber and/or machine verification. In one or more embodiments, the television or monitor device 108 can access the adaptive content server 130 via a media processor device 106, such as a set-top box. The media processor device 106 can communicate with the adaptive content server 130 via the IP network 155 and/or a private network. The adaptive content server 130 can authentic the media processor device 106 via the subscription server 135. In one or more embodiments, the adaptive content server 130 can connect and communicate with devices 116, 118, and 108 for providing streaming content services using other techniques, such as satellite communication links and optical links.

In one or more embodiments, the adaptive content server 130 can maintain preference information 134 that is associated with subscribers to the content services. The preference information can include preferences for how content is delivered, types of devices 116 that the subscribers uses, and types or genres of content that the subscriber prefers. In one or more embodiments, the preference information 134 can include subscriber preferences particular media selections, genres of media content, actors/actresses, and so forth. For example, the subscriber may prefer to view science fiction films from the 1960s, and the preference information 134 can include this as part of the preference information. In one embodiment, the preference information can include the subscriber's preferences for how to dynamically adapt the selected media content. For example, subscriber may prefer that the subscriber's current location and available time for viewing a media selection be given high priority when the adaptive content server 130 modifies the media selection, while the detected emotional characteristic of the subscriber is given low priority during any modification of the media selection. In one or more embodiments, the adaptive content server 130 can maintain these preferences in the preference information to link, for example, a particular subscriber (e.g., Anna) with a particular type of media content (e.g., Horror Series), a particular television network or website (e.g., A&E Network), and a set of adaptations that were performed on a prior selected media content item (e.g., Episode 7, Season 4, adapted episode according to subscriber's available time of 15 minutes and location of commuting to work on subway).

In one or more embodiments, the preference information can include past preferences and configurations that the subscriber has specifically selected, as well as preferences and configurations that the adaptive content server 130 has derived for the subscriber. The subscriber can provide preferences by entering information, responding to queries during the viewing of content (e.g., "Do you prefer adaption according to adaption criteria "A, B, and C" or adaptation criteria "B, D, and E"), and/or by accepting default configurations. The adaptive content server 130 can monitor for changes in preferences by comparing current preferences to past preference, and determine whether to update the subscriber's preferences. In one embodiment, the adaptive content server 130 can update the subscriber's preference information every time the subscriber requests a different media selection, a different adaptation plan, or accepts an adaptation plan that is suggested by the adaptive content server 130. In another embodiment, the adaptive content server 130 can determine if a change in a preference during a current media content session is significant enough to trigger an update in the preference information that is saved at the preference information database 134. For example, the subscriber may be a frequent viewer of a nightly talk show. He may have a preferred adaption, where the adaptive content server 130 generates a 12 minute version of the 30 minute show by selecting all of the jokes from the show. The adaptive content server 130 can generate a version of the nightly talk show that fits his available timing (e.g., he has twelve minutes for watching the show) and his preferred content (e.g., he want to see all of the jokes). If, for example, the subscriber is available to watch the entire media selection and, further, has directed the adaptive content server 130 to provide the entire media selection, excepting the commercial breaks. The adaptive content server 130 can provide the media selection, as directed. Further, the adaptive content server 130 can determine that this very limited set of adaptations is a single event and that, the adaptive content server 130 should not, therefore, update the subscriber's preference information 134 for subsequent instances of this program.

In one or more embodiments, a device 116 of the subscriber can collect information from sensors 187, 188, and 189, which monitor biologic information from that subscriber. Biologic information can include any measureable phenomenon that relates to the physical body of the subscriber. For example, the subscriber's mobile communication device 116 can be coupled to external sensors, such as a heartbeat sensor 188 and/or a blood pressure sensor 187. The mobile communication device 116 can also include built-in sensors 189. The mobile communication device 116 can communicate with these sensors 187-189 via wireless communication links. The sensors 187-189 can report raw, signal information and/or signals that have been converted to digital measurements by the sensor prior to transmission to the mobile communication device 116 (e.g., smart sensor technology). The biologic information can include basic bodily measurements, such as the subscriber's temperature, heartbeat rate, respiration rate, temperature, motion, and/or gestures. The biologic information can include audio and/or video that can be captured using the audio and/or video devices of the mobile communication device 116.

In one or more embodiments, one or more of the sensors 188 can be "always live" such that the mobile communication device 116 captures a continuous stream of biologic information. Any portion of the biologic information that is collected for the subscriber can be transmitted the adaptive content server 130 for use adaptation of media selections.

The biologic information can be sent directly to the adaptive content server 130 or can be sent, first, to a different server of the content provider or to a third-party server and then shared with the adaptive content server 130. The adaptive content server 130, or the mobile communication device 116, can analyze information from one or more of the sensors 187-189 to determine one or more emotional characteristics for the current state of the subscriber. For example, the adaptive content server 130 can compare heart rate measurement and a temperature of the subscriber to pre-established thresholds and concluded that the subscriber is relaxing or is sleepy. Or, the adaptive content server 130 can conclude that the subscriber may be agitated or in a happy state. The adaptive content server 130 can determine that the subscriber is in several identifiable emotional states. Or, the adaptive content server 130 can determine that the subscriber's emotional state is not undetermined. The adaptive content server 130 can add audio and/or video information to, for example, a blood pressure reading to determine the emotional characteristic. For example, the adaptive content server 130 can distinguish and underdetermined state from a state, where the subscriber is concentrating on a project for school.

In one or more embodiments, the adaptive content server 130 can use the current emotional characteristic of the subscriber to determine how to adapt a media selection for meeting the needs of the subscriber. For example, the media selection can be an action movie, featuring several car chase sequences interspersed with a relatively slow back story. If the adaptive content server 130 determines from the biologic information that the subscriber is in relaxed state, the adaptive content server 130 may conclude that the subscriber, who has selected the action movie, is perfectly fine with keeping the slower scenes in the film. Conversely, if the adaptive content server 130 determines that the subscriber is in an agitated state, then the adaptive content server 130 can concluded that the subscriber would rather watch a more condensed version of the film that focuses on the car chases. In either of the examples, the adaptive content server 130 could make the opposite assessment about which direction the subscriber might want to go with the media selection. In one or more embodiments, as the subscriber uses the system 100, the adaptive content server 130 can determine which direction fits this particular subscriber by relying on direct and/or indirect feedback from the subscriber. Direct feedback can be in the form of the subscriber indicating that she likes or dislikes the version of the media selection that has been generated by the adaptive content server 130 based on its assessment of the subscriber's emotional characteristic. Indirect feedback can be obtained by the adaptive content server 130 by looking, again, at the biologic information to determine if the subscriber's emotional characteristic fits the objective of the modified media selection.

In one or more embodiments, the adaptive content server 130 can receive availability information for the subscriber. The availability information can include information that is directly provided by the subscriber. For example, the subscriber can enter information into the mobile communication device 116, or another user device, indicating her availability for watching (or listening to) the media selection. The subscriber can thereby inform the adaptive content server 130 that she can watch the media selection "during the next 20 minutes" or that she wants to see a version of this movie that is exactly one hour in length. The information can be provided indirectly by the subscriber as well. For example, the subscriber may keep a daily planner or calendar of event or alarms in her mobile communication device 116. The adaptive content server 130 can access this planner/calendar/alarm information to determine the subscriber's availability (at least in part). For example, if the subscriber's calendar indicates that she is only available to watch the media selection for two hours in the evening, then the adaptive content server 130 can determine that those two hours are the maximum length that is available the media selection. If the media selection is three episodes of a one-hour series. Then the adaptive content server 130 can determine that the three hours of selected programming will need to be reduced to two-hours (or less) to fit the viewing window of the subscriber. In one or more embodiments, the adaptive content server 130 can combine the availability information with the emotional characteristic of the subscriber to direct the modification of the media selection. Returning to the example of the action movie from above, the adaptive content server 130 can decide that, in spite of the fact that the subscriber's current emotional characteristic would allow for viewing the entire film, including both the car chase scenes and the slower backstory, it is better for the adaptive content server 130 to, in fact, edit out most of the slower backstory elements so that the runtime of the modified version of the media selection fits within the availability of the subscriber.

In one or more embodiments, the mobile communication device 116 can utilized its on-board location technology to determine a location for the mobile communication device 116 (and, therefore, of the subscriber in possession of the device). For example, the mobile communication device 116 can use a Global Positioning System (GPS) capability to determine the GPS coordinates of the current location. The mobile communication device 116 track the historical coordinates of a time period to establish not only the presence of the subscriber at the current location but also to estimate how long the subscriber has been at the location, whether she is moving relative to the location, and an estimate of how long she might remain in the location. In another example, the mobile communication device 116 can user information from a map or navigation application to convert the coordinate-based location information into real world location information. In one or more embodiments, the mobile communication device 116 can report location information (real world and/or GPS coordinate) to the adaptive content server 130.

In one or more embodiments, the adaptive content server 130 can use the location information to determine a current location of the mobile communication device 116. In one embodiment, the adaptive content server 130 can determine the viewing environment of the location. For example, the subscriber may be located in her home, her office, a shopping mall, a theme park, a cinema, a carnival, an automobile, an airplane, and/or a stadium. In one or more embodiments, the mobile communication device 116 can report video and/or audio information to the adaptive content server 130 to provide additional context for the location and to thereby determine a viewing setting. For example, where the location information corresponds to the viewing environment a theme park, the additional video/audio information can be used by the adaptive content server 130 to determine that the viewing setting is, in fact, a birthday party that is occurring at the theme park. For example, the adaptive content server 130 can determine the viewing setting is a vacation, a current airline flight, a current cruise on a cruise ship, a date, a wedding, a honeymoon celebration, or an anniversary. In one or more embodiments, the adaptive content server 130 can combine the viewing environment and the viewing setting when determining how to modify the media selection. For example, if the subscriber has requested the action film for immediate viewing, and the adaptive content server 130 determines that the subscriber is currently at a birthday party at a theme park, then the adaptive content server 130 can use this information to determine that the modification of the media selection should result in removing a scene in the film that includes sexual content and several instances of course language. In one or more embodiments, the adaptive content server 130 can combine any or all of the emotional characteristic, the availability, and the location information when determining how to modify the media selection.

In one or more embodiments, the adaptive content server 130 can modify the media selection in a number of ways. For example, the adaptive content server 130 can remove content from the media selection to create the modified version, as described above. The adaptive content server 130 can enhance media selection. For example, the adaptive content server 130 can determine from the subscriber information (preference, biologic, location, availability) that the subscriber would benefit from watching a version of the media selection where the volume of spoken voices was raised, while the volume of automobiles is lowered. The adaptive content server 130 can modify the audio of the media selection to achieve the needed changes using, for example, a digital signal processor (DSP).

In one or more embodiments, the adaptive content server 130 can enhance the media selection by adding content from another media selection. For example, the adaptive content server 130 can generate a modified version of a first media selection by adding content from a second media selection. Any available approach for the adaptive content server 130, such as adding, subtracting, lengthening, shortening, and/or enhancing the media selection can be performed as a combination of one or many steps. In one or more embodiments, the adaptive content server 130 can determine from the subscriber information (preference, biologic, location, availability) that the adaptive content server 130 should generate a version of the media selection that includes content from a second media selection. The adaptive content server 130 can determine which second media selection based on the subscriber information or based on direct input of the subscriber. For example, the adaptive content server 130 can direct the mobile communication device to ask the subscriber for the second media selection.

In one or more embodiments, the adaptive content server 130 can access social media information 184 that is associated with the subscriber. The subscriber can be a member of one or more social media networks (e.g., Facebook™, Twitter™). As part of these social media networks, the subscriber can have associated co-members (e.g., "Friends"), who share interests. For example, the adaptive content server 130 can receive social media information 184 from a social media server 180 respecting one or more social media groups to which the subscriber belongs. The adaptive content server 130 can determine from the social media information 184, location information, preference information, and/or availability information for the subscriber, which can be used to direct modification of the media selection.

Figure 3:
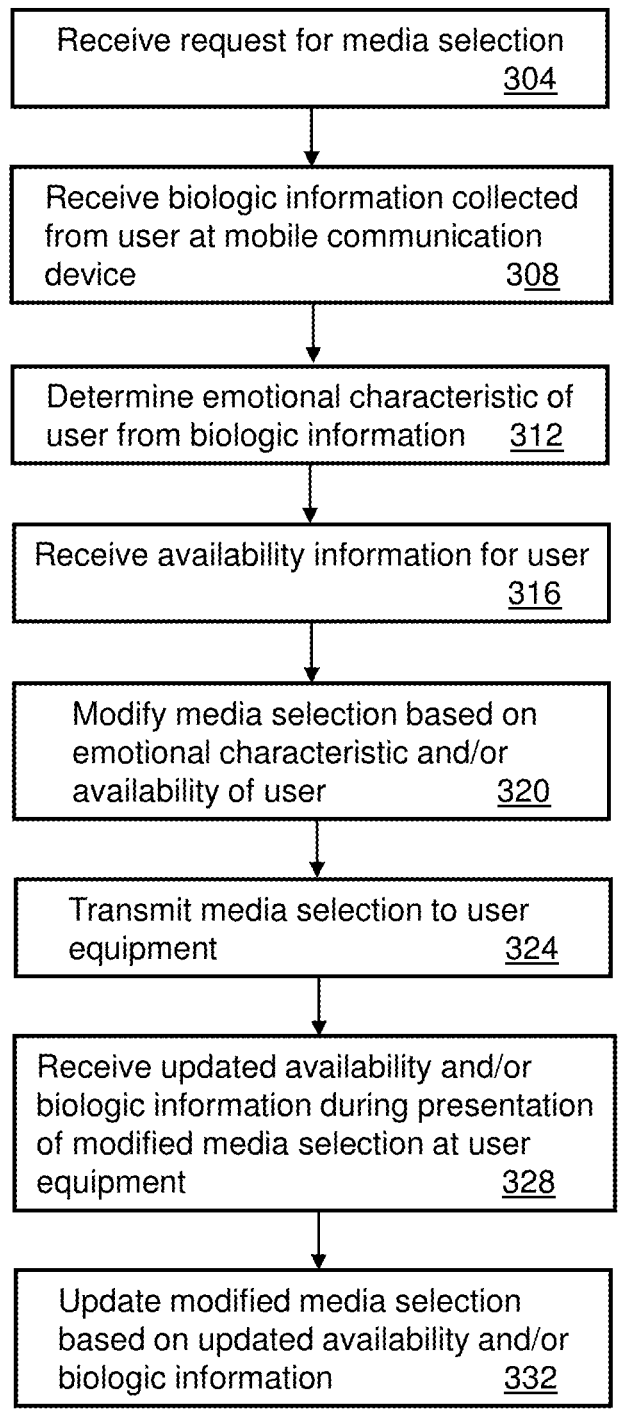
FIG. 3 depicts illustrative embodiments of a method used in portions of the system described in FIGS. 1 and 2.

FIG. 3 depicts an illustrative embodiment of a method used by in portions of the system described in FIGS. 1 and 2. In particular, FIG. 3 shows illustrative embodiments of a method 300 for providing dynamically configurable, media content to subscriber devices.

In step 304, an adaptive content server 130 can receive a request for a media selection. The request can come from a user device, such as a mobile communication device 116 that is associated with the subscriber. The request can come from another device that is associated with the subscriber. For example, a user device, such as a media processor 106 can make the request for the media selection to the adaptive content server 130. In step 308, the adaptive content server 130 can receive biologic information that has been collected from the subscriber (or other user) of the mobile communication device. In step 312, the adaptive content server 130 can use the biologic information to determine one or more emotional characteristics of the subscriber. One or more pieces of biologic information can be combined to make the determination. Additional information, including availability information, location information, and/or social media information can be used to determine the emotional characteristic. In step 316, the adaptive content server 130 can receive availability information for the subscriber.

In step 320, the adaptive content server 130 can modify the media selection based on the emotional characteristic and the availability of the subscriber. In one or more embodiments, the media selection can be modified based only the emotional characteristic or the availability of the subscriber. In step 324, the adaptive content server 130 can transmit the modified media selection to the user equipment of the subscriber (or to another device). In steps 328-332, the adaptive content server 130 can receive additional and/or updated biologic and/or availability information from the user device indicative of the current biologic and/or availability of the subscriber during presentation of the media selection. The adaptive content server 130 can use the additional and/or updated biologic and/or availability information to further modify the media selection, thereby providing dynamic adaptation of the media selection before, during, and after its presentation at the user device.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
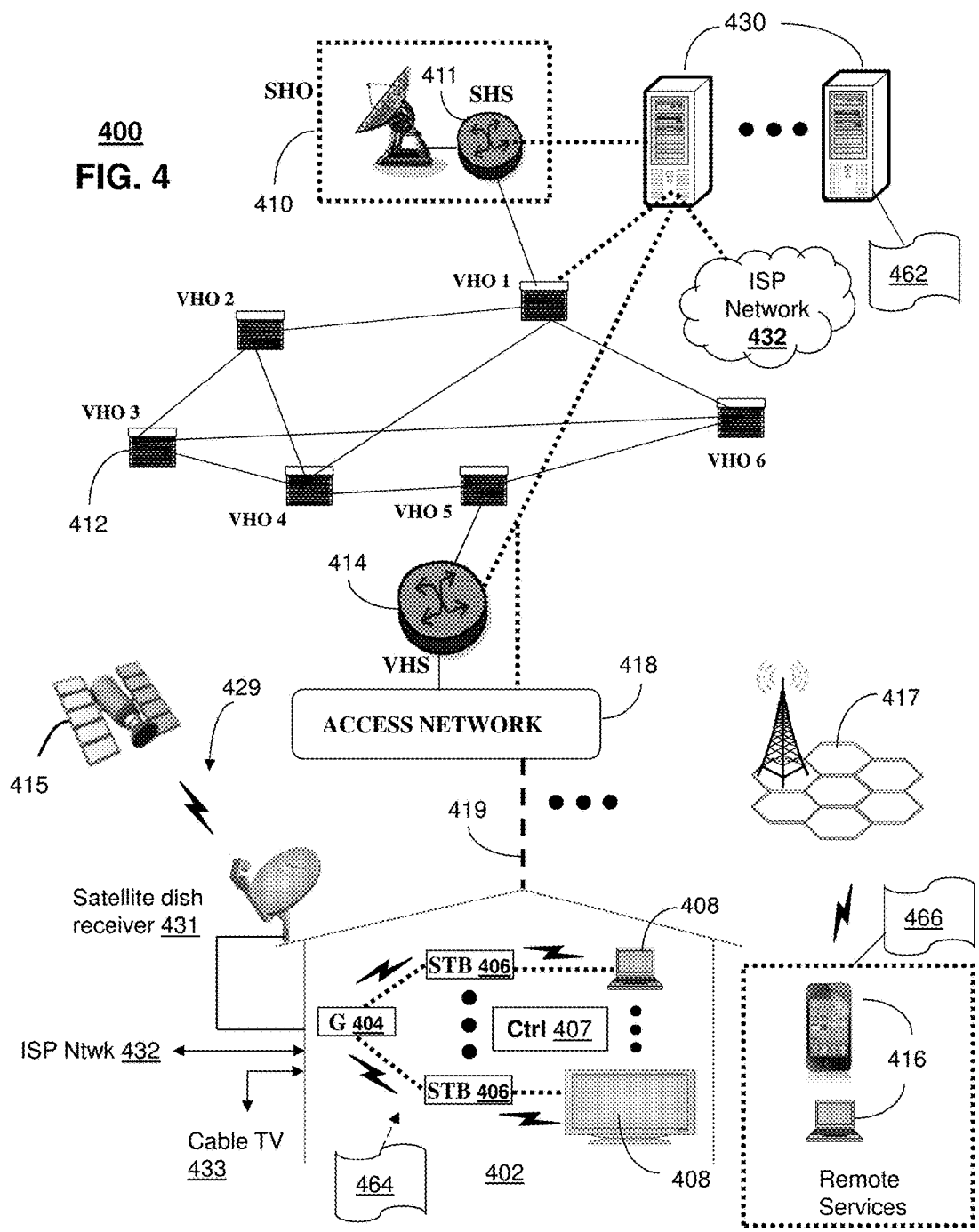
FIGS. 4-5 depict illustrative embodiments of communication systems that provide configurable event content according to the embodiments illustrated in FIGS. 1 and 2.

FIG. 4 depicts an illustrative embodiment of a first communication system 400 for delivering media content. The communication system 400 can represent an Interactive Television System, such as an Internet Protocol Television (IPTV) media system. Communication system 400 can be overlaid or operably coupled with systems 100 and 200, of FIGS. 1 and/or 2, as another representative embodiment of communication system 400. For instance, one or more devices illustrated in the communication system 400 of FIG. 4 can be used for adapting media selections in the communication system to reflect subscriber (user) emotional characteristics, availability, location, and/or preferences.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/ or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an adaptive content server 130 (herein referred to as dynamic content server 430). The dynamic content server 430 can use computing and communication technology to perform function 462, which can include among other things, the dynamic content modification techniques described by method 300 of FIG. 3. For instance, function 462 of server 430 can be similar to the functions described for the adaptive content server 130, of FIGS. 1 and 2, in accordance with method 300, of FIG. 3. The media processors 406 and wireless communication devices 416 can be provisioned with software functions 464 and 466, respectively, to utilize the services of dynamic content server 430. For instance, functions 464 and 466 of media processors 406 and wireless communication devices 416 can be similar to the functions described for the communication devices 116, 118, and 106 of FIG. 1 in accordance with method 300, of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
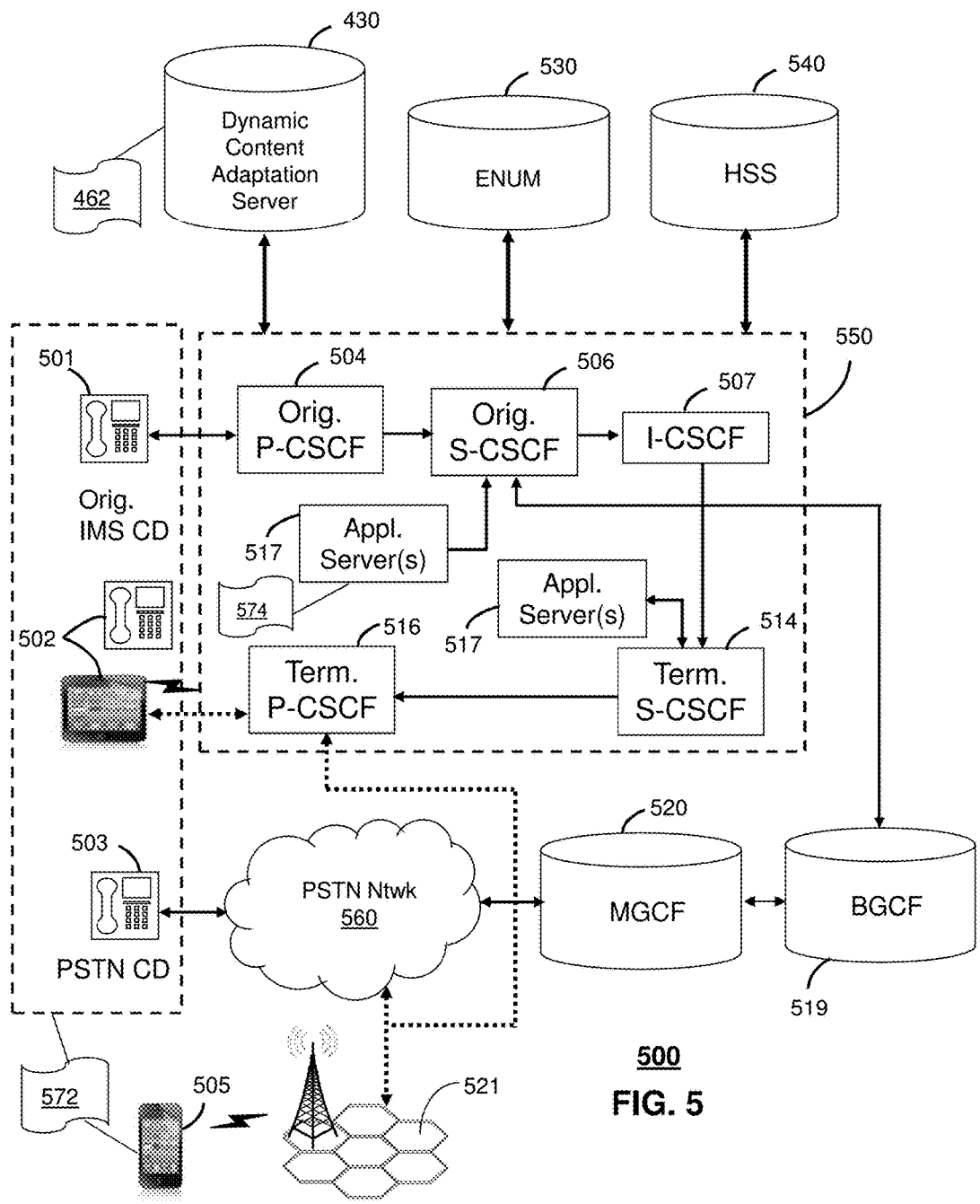

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100 and 200, of FIGS. 1 and 2, and communication system 400 as another representative embodiment of communication system 400. The communication system 500 of FIG. 5 can be used for adapting media selections in the communication system to reflect subscriber (user) emotional characteristics, availability, location, and/or preferences.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The dynamic content server 430 of FIG. 4 can be operably coupled to communication system 500 for purposes similar to those described above. Dynamic content server 430 can perform function 462 and thereby provide dynamic content services to the CDs 501, 502, 503 and 505 of FIG. 5 similar to the functions described for the adaptive content server 130 of FIG. 1 in accordance with method 300 of FIG. 3. CDs 501, 502, 503 and 505, which can be adapted with software to perform function 572 to utilize the services of the dynamic content server 430 similar to the functions described for communication devices 116 of FIGS. 1 and 2 in accordance with method 300 of FIG. 3. Dynamic content server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
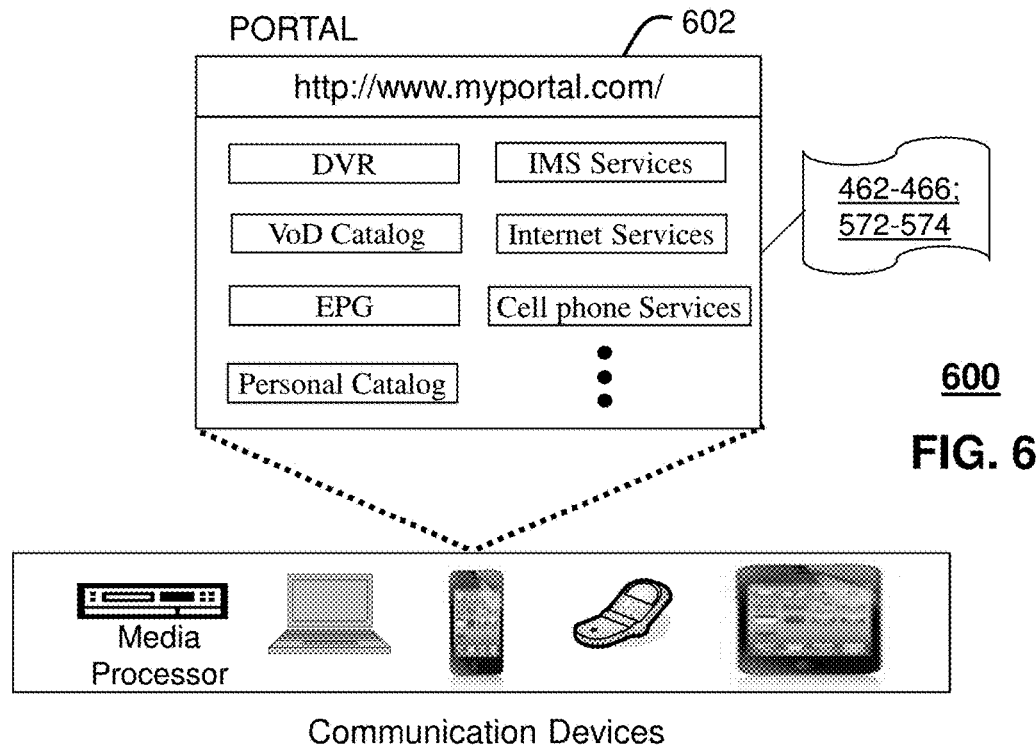
FIG. 6 depicts an illustrative embodiment of a web portal for interacting with the communication systems of FIGS. 1, 2, 4 and 5.

FIG. 6 depicts an illustrative embodiment of a web portal 602 of a communication system 600. Communication system 600 can be overlaid or operably coupled with systems 100 and 200 of FIGS. 1 and 2, communication system 400, and/or communication system 500 as another representative embodiment of systems 100 and 200 of FIGS. 1 and 2, communication system 400, and/or communication system 500. The web portal 602 can be used for managing services of systems 100 and 200 of FIGS. 1 and 2 and communication systems 400 and 500. A web page of the web portal 602 can be accessed by a Uniform Resource Locator (URL) with an Internet browser using an Internet-capable communication device such as those described in FIGS. 1, 2, 4, and 5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100 and 200 of FIGS. 1 and 2, and communication systems 400 and 500. For instance, users of the services provided by the adaptive content server 130 or 430 can log into their on-line accounts and provision the servers 130 or 430 with preference information regarding media content types and/or configuration of media content or to provide device contact information to the adaptive content server 130 or 430 to enable it to communication with devices described in FIGS. 1-5. Service providers can log onto an administrator account to provision, monitor and/or maintain the systems 100 and 200 of FIGS. 1 and 2 or server 430.

Figure 7:
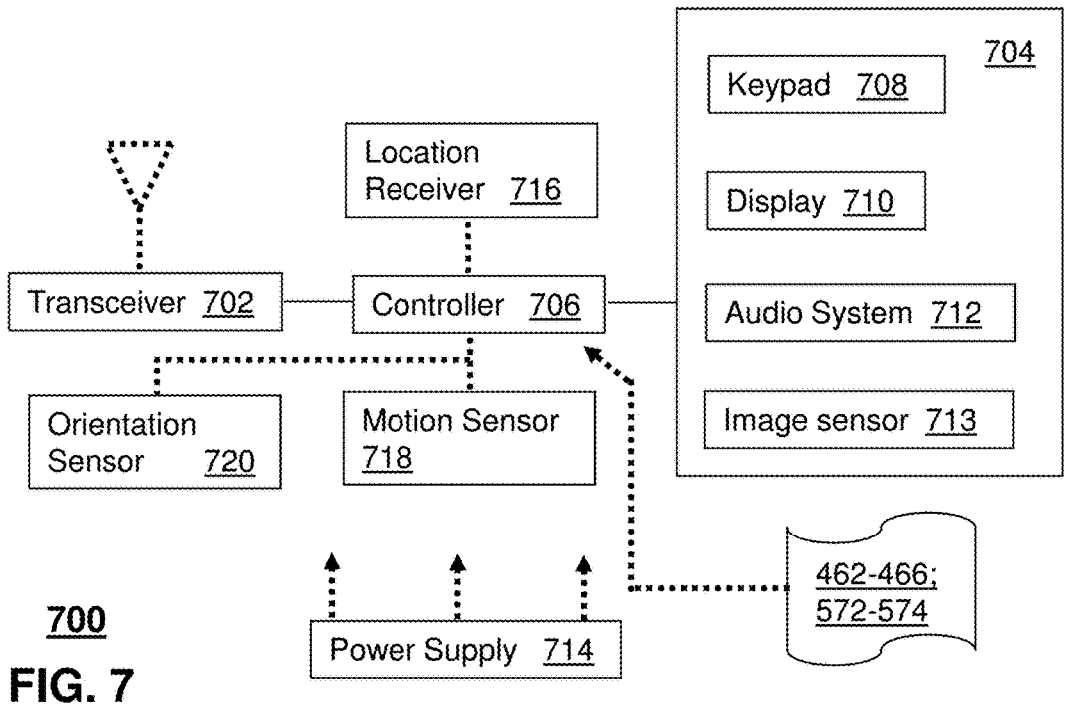
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1, 2, 4, and/or 5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
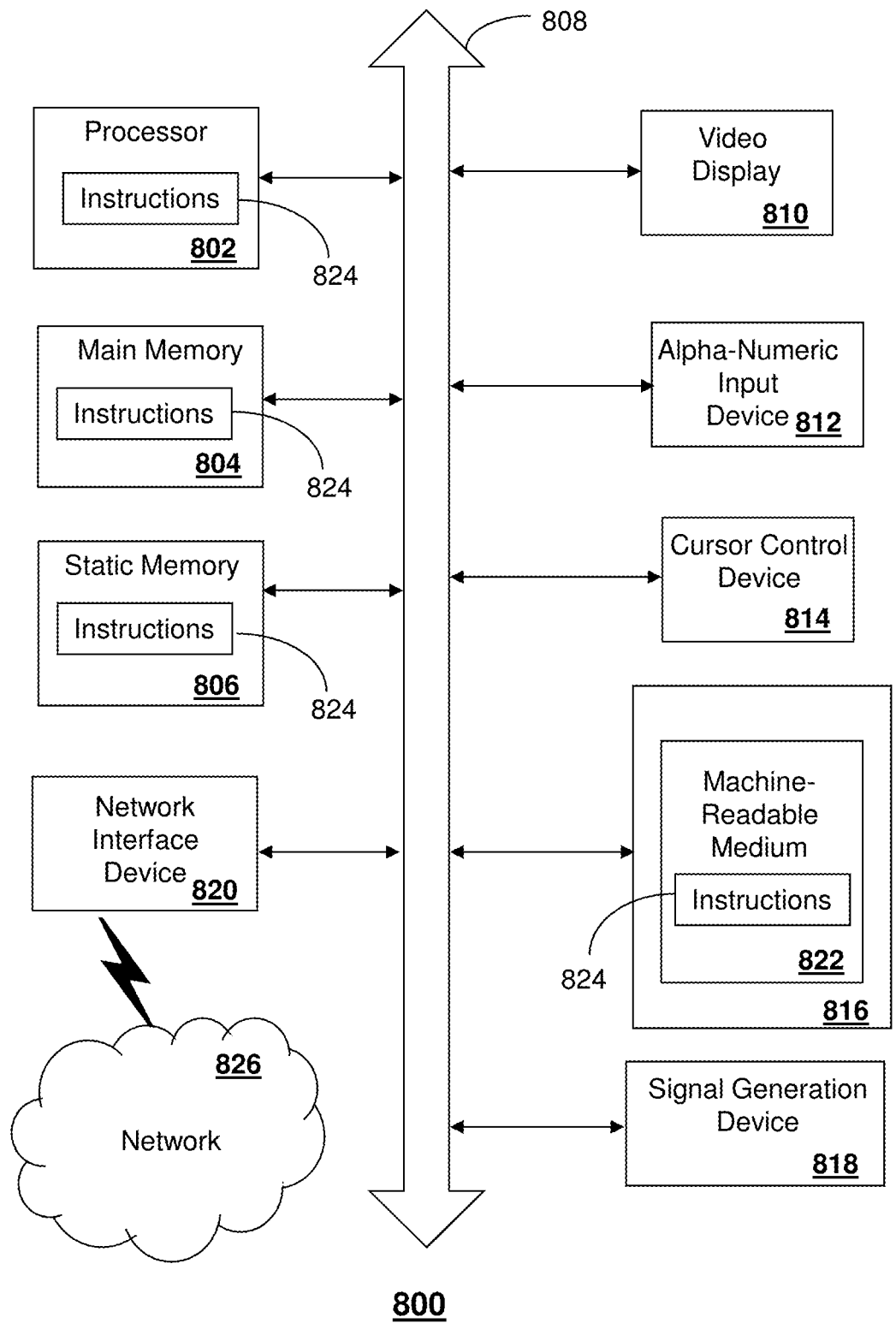
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the adaptive content server 130, the media processor 106, the mobile communication device 116, the computer device 118, the social media server 180, the subscription server 135, and/or other devices of FIGS. 1-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) can represent an example of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a processing system including a processor, biologic information associated with a body of a user and collected via a mobile communication device;
   determining, by the processing system, an emotional characteristic associated with the user according to the biologic information, wherein the emotional characteristic corresponds to a current mood of the user;
   receiving, by the processing system, a request to provide a first media selection to user equipment associated with the user;
   receiving, by the processing system, first availability information associated with the user;
   modifying, by the processing system, a first version of the first media selection according to the emotional characteristic of the user and according to the first availability information associated with the user to generate a second version of the media selection; and
   transmitting, by the processing system, the second version of the media selection to the user equipment associated with the user for presentation at the user equipment.

2. The method of claim 1, wherein the biologic information includes heart rate, blood pressure, respiration, or any combination thereof.

3. The method of claim 1, wherein the biologic information includes movement.

4. The method of claim 1, further comprising receiving, by the processing system, first availability information associated with the user, wherein the modifying of the first version of the first media selection is further according to the first availability information that is received.

5. The method of claim 1, wherein a first runtime of the second version of the first media selection corresponds to the first availability information.

6. The method of claim 1, wherein the biologic information includes audio, video, or a combination thereof.

7. The method of claim 1, wherein the mobile communication device comprises a wearable device.

8. The method of claim 1, wherein the user equipment comprises the mobile communication device.

9. The method of claim 1, further comprise receiving, by the processing system, a user preference associated with the user, wherein the modifying of the first version of the first media selection is further according to the user preference.

10. The method of claim 9, further comprising:
    receiving, by the processing system, user feedback associated with the presentation of the second version of the first media selection at the user equipment; and
    updating, by the processing system, the user preference associated with the user according to the user feedback that is received.

11. The method of claim 1, further comprising determining, by the processing system, a second media selection according to the first media selection and the emotional characteristic, wherein the modifying of the first version of the first media selection further comprises adding, by the processing system, a second portion of the second media selection to the first media selection corresponding to the emotional characteristic.

12. The method of claim 1, further comprising receiving, by the processing system, location information associated with the user, wherein the determining of the emotional characteristic associated with the user is further according to the location information.

13. A non-transitory machine-readable storage medium, comprising executable instructions that, when executed by a processing system including a processor, facilitate performance of operations, comprising:

receiving biologic information associated with a body of a user and collected via a mobile communication device;

determining an emotional characteristic associated with the user according to the biologic information, wherein the emotional characteristic corresponds to a current mood of the user;

receiving a request to provide a first media selection to user equipment associated with the user;

receiving first availability information associated with the user;

modifying a first version of the first media selection according to the emotional characteristic of the user and according to the first availability information associated with the user to generate a second version of the first media selection; and transmitting the second version of the first media selection to user equipment associated with the user for presentation at the user equipment.

14. The non-transitory machine-readable storage medium of claim 13, wherein the operations further comprise determining a setting for the presentation of the second version of the first media selection at the user equipment, wherein the modifying of the first version of the first media selection is further according to the setting that is determined.

15. The non-transitory machine-readable storage medium of claim 14, wherein the operation further comprises accessing social media information associated with the user, wherein the setting for the presentation of the second version of the first media selection at the user equipment is further determined according to the social media information.

16. The non-transitory machine-readable storage medium of claim 15, wherein the emotional characteristic associated with the user is further determined according to the social media information.

17. The non-transitory machine-readable storage medium of claim 13, wherein the operations further comprise determining whether the user has viewed the first version of the first media selection, wherein the first version of the first media selection modified responsive to the determining that the user has not viewed the first version of the first media selection.

18. A device, comprising:

a processing system including a processor; and a memory that stores executable instructions that, when executed by the processing system, facilitate performance of operations, the operations comprising:

receiving biologic information associated with a body of a user and collected via a mobile communication device;

determining an emotional characteristic associated with the user according to the biologic information, wherein the emotional characteristic corresponds to a current mood of the user;

receiving a request to provide a first media selection to user equipment associated with the user;

receiving first availability information associated with the user;

modifying a first version of the first media selection according to the emotional characteristic of the user and according to the first availability information associated with the user to generate a second version of the media selection; and transmitting the second version of the media selection to the user equipment associated with the user for presentation at the user equipment.

19. The device of claim 18, wherein the biologic information includes heart rate, blood pressure, respiration, or any combination thereof.

20. The device of claim 18, further comprising receiving first availability information associated with the user, wherein the modifying of the first version of the first media selection is further according to the first availability information that is received.

* * * * *